June 15, 1937.  W. C. JACKSON  2,084,087
AUTOMOBILE FENDER CLAMP
Filed Feb. 15, 1937  3 Sheets-Sheet 1
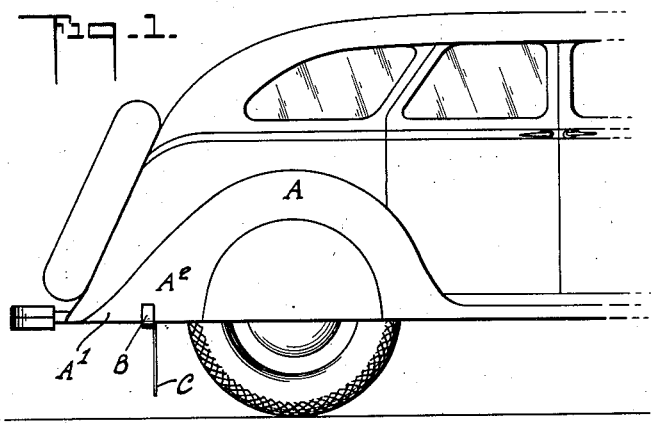
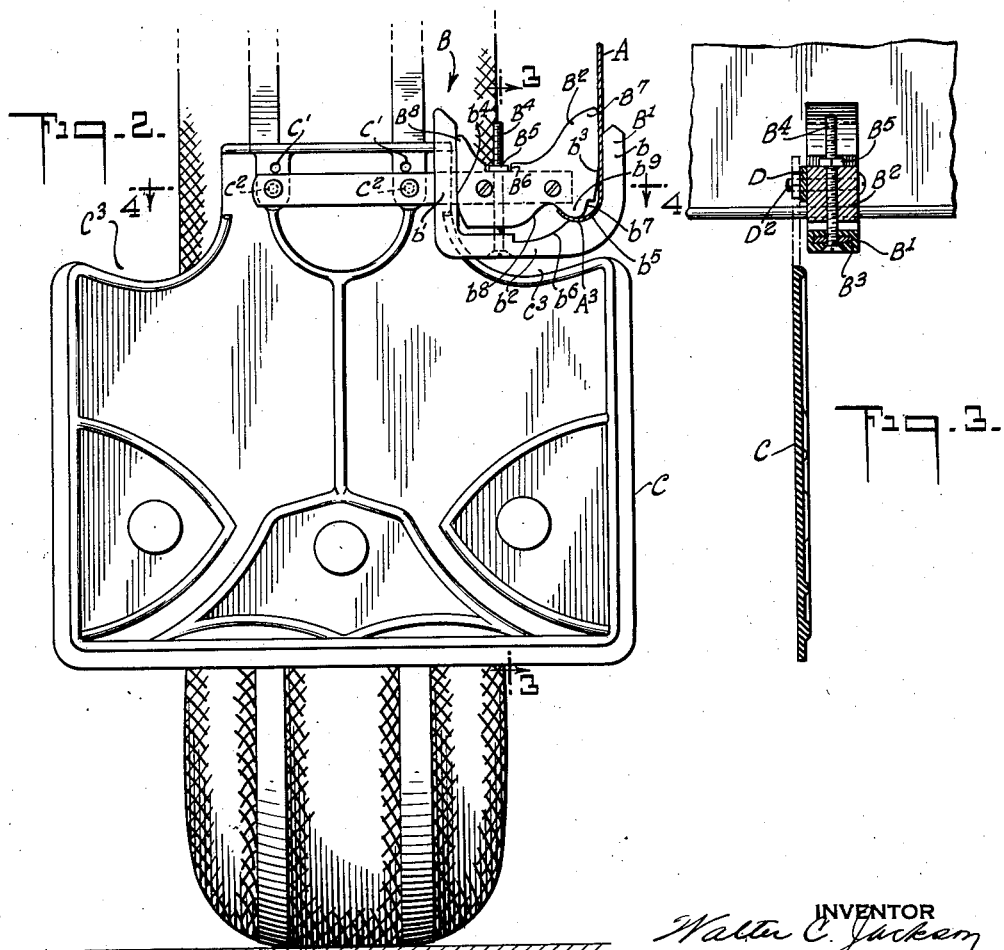
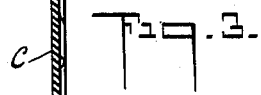

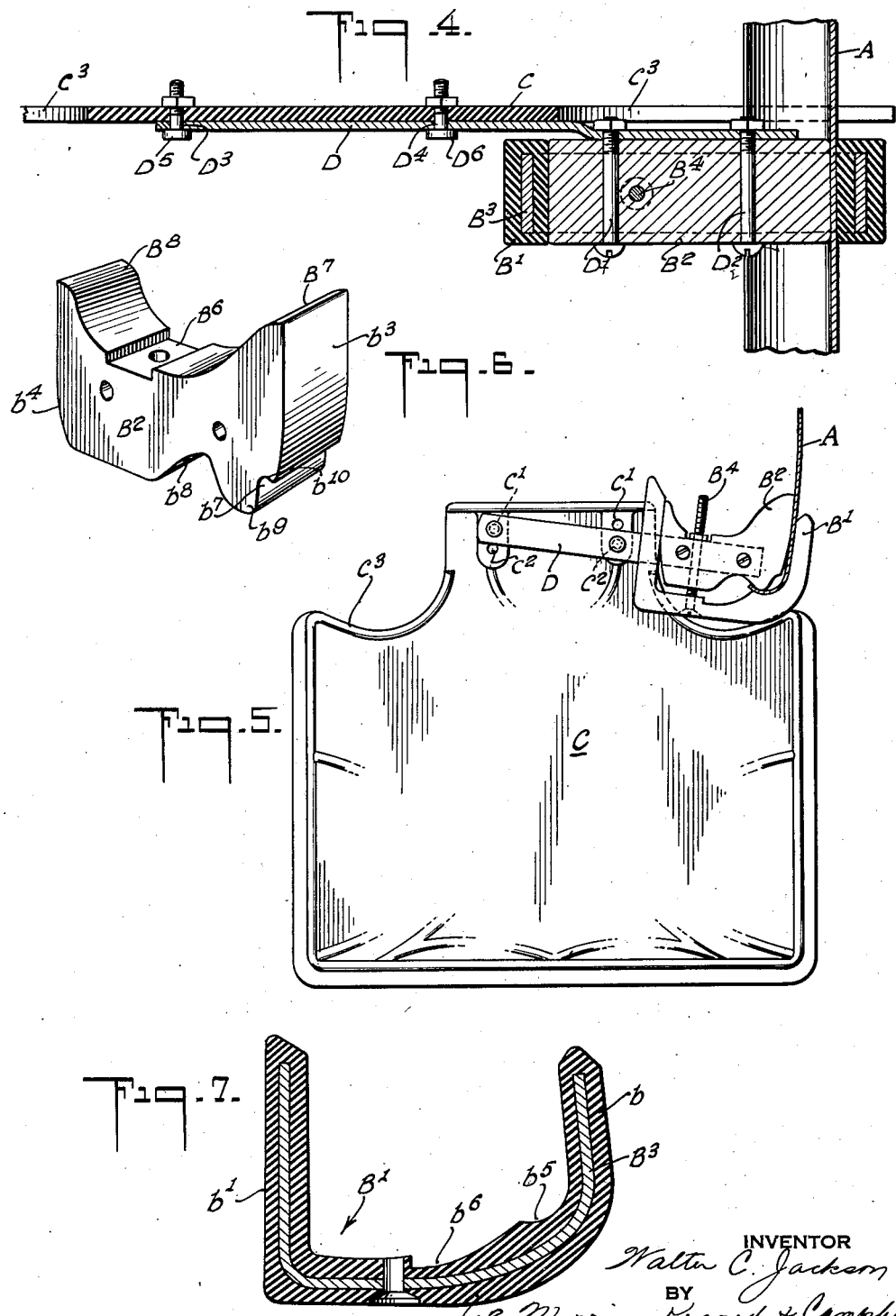

June 15, 1937. W. C. JACKSON 2,084,087
AUTOMOBILE FENDER CLAMP
Filed Feb. 15, 1937 3 Sheets-Sheet 3
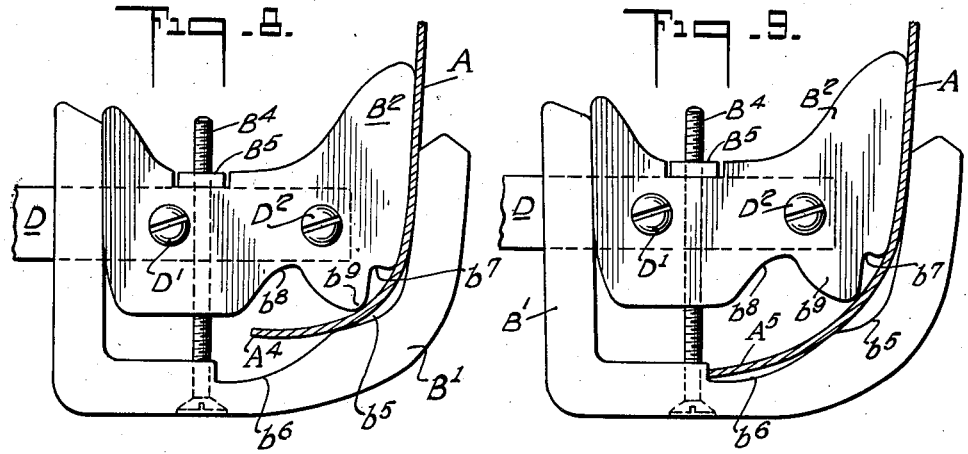
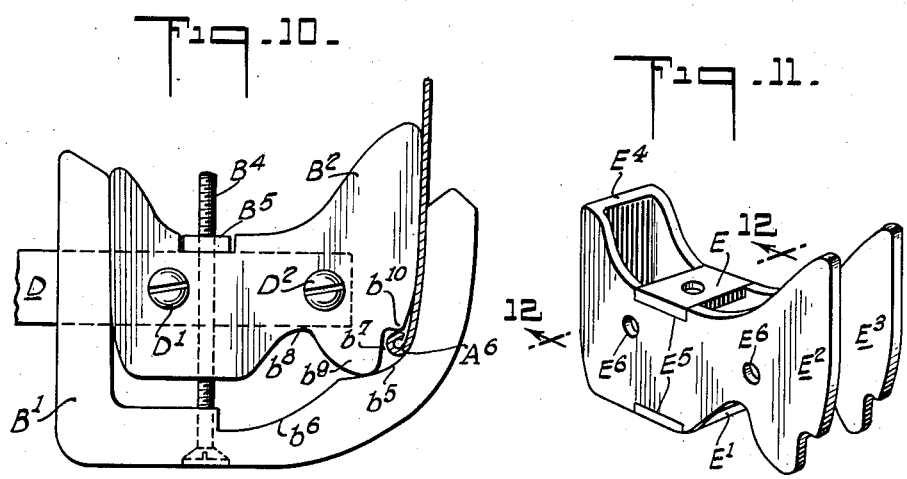
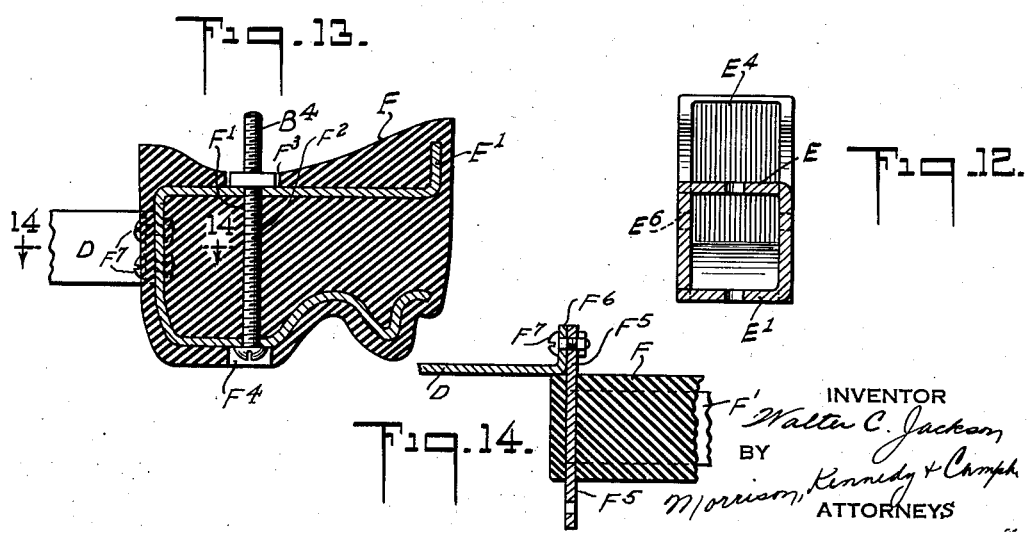
INVENTOR
Walter C. Jackson
BY
Morrison, Kennedy & Campbell
ATTORNEYS Patented June 15, 1937

2,084,087

UNITED STATES PATENT OFFICE 2,084,087

AUTOMOBILE FENDER CLAMP

Walter C. Jackson, Rahway, N. J., assignor to Tingley-Reliance Rubber Corporation, a corporation of New Jersey Application February 15, 1937, Serial No. 125,758

12 Claims. (Cl. 280—152)

This invention relates to a clamp adapted to be attached to an automobile fender, and more particularly to one for supporting a fender flap.

Heretofore, the attachment of a fender flap to the rear fender of an automobile presented little difficulty, since as such fenders were constructed, they presented at their rear a straight edge substantially parallel with the ground and relatively near the wheel. As thus constructed, they were admirably suited for the attachment of a fender flap of the type herein referred to. Recently, however, the demand for streamline effects has resulted in fenders with long sweeping overhangs at the rear and with such various shapes at their rear edges that the attachment of the fender flaps in the usual way is substantially precluded, at least, if they are to serve their intended purpose. Then, too, the variations in design of fenders at their rear edges, has practically forbidden a mode of attachment which will be applicable to the various different popular makes of automobiles.

Despite the variation in fender design, insofar as the rear edge is concerned, there nevertheless is one similarity in substantially all contemporary rear fenders, i. e., that along the side of the fender just rearwardly of the wheel, there is a flat substantially vertical surface disposed in a plane fore-and-aft of the car, and it is this portion of the fender that has been utilized in the instant case for the attachment of the fender flap.

According to the present invention, there is provided a clamp arranged to be attached to the fender in the position noted and which includes a substantially U-shaped member, one leg of which at its inner face is disposed in contact with the outer side face of the fender adjacent the bottom edge thereof. The base of the U-shaped member passes beneath the bottom edge of the fender, while the other leg is located in spaced relation with the inner face thereof. A second member is then wedged between the leg of the U-shaped member disposed inside the fender, and the inner face of the latter, means being provided for drawing the two members relatively together so as to augment the wedging action and thus to secure the clamp firmly to the fender.

To one of the clamp members, preferably the inner wedging one, there is attached an arm from which the fender flap is suspended, this arm extending inwardly in a direction transversely of the automobile, and secured at one end only, namely, where it is attached to the clamp, so that it presents a cantalever construction for the support of the fender flap. The respective clamp members in their opposed faces, that is, between which the fender is disposed in service, are designed in a way to accommodate all of the present day fenders, regardless of the various configurations of their lower edges, so that the clamp, together with the cantalever support for the flap, presents a universal construction applicable to substantially all contemporary automobile models.

Referring to the drawings:

Fig. 1 is a side elevation of a portion of an automobile, showing the improved clamp attached thereto;

Fig. 2 is an enlarged vertical sectional view through a portion of an automobile fender just rearwardly of the rear wheel, showing the improved clamp attached thereto and a fender flap supported thereby;

Fig. 3 is a vertical sectional view on line 3—3 of Fig. 2;

Fig. 4 is a horizontal sectional view on line 4—4 of Fig. 2;

Fig. 5 is a vertical sectional view similar to Fig. 2, but illustrating a fender of a different type and one requiring an adjustment of the fender flap with respect to its support to permit vertical hanging thereof;

Fig. 6 is a perspective view of the inner wedge member of the clamp;

Fig. 7 is a vertical sectional view through the outer member of the clamp;

Figs. 8, 9, and 10 are side elevational views of the clamp, showing its attachment to automobile fenders shaped differently at their lower edges;

Fig. 11 is a perspective view of an inner member of the clamp formed of pressed sheet metal;

Fig. 12 is a vertical sectional view on line 12—12 of Fig. 11;

Fig. 13 is a vertical sectional view of another form of inner clamp member and made of rubber with a steel reinforcing element embedded therein; and Fig. 14 is a partial horizontal sectional view on line 14—14 of Fig. 13.

A typical contemporary automobile model is illustrated in Fig. 1, wherein it will be noted that the fender A at the rear of the wheel has a long overhang $A^1$, so that if a flap were applied to such a fender at its rear edge, its distance from the wheel would be such as to render it of no practical value. Just rearwardly of the wheel, however, the fender sweeps downwardly in a substantially vertical fore-and-aft plane, as at $A^2$, and it is this region, as previously stated, that has been selected in accordance with the present invention for the attachment of a clamp B for the support of a fender flap C. This substantially vertical portion $A^2$ of the fender extends rearwardly of the wheel for a distance sufficient to permit the clamp and consequently the flap to be adjusted in a fore-and-aft direction to a position wherein it will have its maximum efficiency.

Although the fenders of the various popular makes of cars have this flat vertical portion in common, this is where the similarity ends. The lower edges of the fenders vary widely in shape, some being formed merely with a bead, while others are turned inwardly on different radii. Regardless of the shape, however, the clamp B, formed in accordance with the instant invention, admirably suffices, as will be evident from the description below.

Referring to Figs. 2 and 3, it will be seen that the clamp B includes two members $B^1$ and $B^2$. The outer member $B^1$ is formed with two spaced legs $b$ and $b^1$, the inner face of leg $b$ resting against the outer face of the fender A, while the other leg $b^1$ is disposed in spaced relation to the inner face of the fender, and formed also with an intermediate connecting portion $b^2$, which passes beneath the fender. Preferably, the member $B^1$ is formed of molded rubber with a reinforcing element $B^3$ of spring steel embedded therein to provide strength (see Fig. 7). The second member $B^2$ is arranged to fit between the fender A and the leg $b^1$ and has a taper in its end faces, as at $b^3$ and $b^4$, so that as it is drawn downwardly into position, it will exert a wedging action on the fender and on the leg $b^1$ with which it is in contact. Since the outer member $B^1$ is strong and fairly rigid in character, this wedging action will cause the fender A to be clamped tightly between the inner and outer members and thus act firmly to hold the clamp in position. A bolt $B^4$ extends vertically through the two members $B^1$ and $B^2$ of the clamp in registering holes provided for the purpose, and at the top of the bolt there is threaded a nut $B^5$ arranged to seat in a recess $B^6$ formed in the inner clamping member at the top, the arrangement being such that, as the bolt is screwed up, it will pull the two members of the clamp together to exert the pressure hereinbefore alluded to. The size of the recess $B^6$ into which the nut fits is such as to prevent the nut from turning during the application of the clamp to the fender. Thus, the only tool necessary for installation is a screw driver or wrench, depending upon the type of head formed on the bolt. In order to augment or increase the area of the wedging surfaces, the inner member $B^2$ extends upwardly on both sides of the bolt, as at $B^7$ and $B^8$, for this purpose.

The flap C is secured to the clamp through the medium of a horizontal bar D which is fastened at one end to the inner clamp member $B^2$ by a pair of spaced bolts $D^1$ and $D^2$ (see Fig. 4), which preclude any relative movement between the bar and the clamp member. The bar D extends inwardly from the fender and beyond the clamp, this extension of the bar being formed with a pair of spaced holes $D^3$ and $D^4$ and through which there extends a pair of bolts $D^5$ and $D^6$ by which the flap is secured thereto. At this point, it might be stated that the flap is equipped at the top with two pairs of holes $C^1$ and $C^2$ arranged at different levels. Ordinarily, when the shape of the automobile fender is such that the bar D is disposed in parallel relation with the ground, the two bottom holes $C^1$ of the fender flap are used, as shown in Fig. 2. However, if the shape of the automobile fender is such that the bar D is disposed at an angle (see Fig. 5), one of the top holes $C^1$ and one of the bottom holes $C^2$ can be used, so that the fender flap will hang vertically, irrespective of the shape of the fender.

The fender flap itself in its two upper corners is cut out, as at $C^3$, so that it will clear the lower edge of the fender. The two cut-out portions are provided, since it is intended that one form of flap may be used for either the left or right side of the car. It will also be noticed that the supporting bar D itself in that portion which supports the flap is offset slightly out of the plane of the portion secured to the clamp member (see Fig. 4) in order that there will be no interference between the supporting bar and the outer clamp member $B^1$ when the clamp is being secured to the fender. It will also be understood that the clamp itself may be applied to the left hand fender of the car, as well as to the right fender as shown, in which case the bar D will be fastened to the face of the inner clamp member opposite that shown in Fig. 4, the clamp itself when secured to the left hand fender being merely reversed.

In order that the clamp will be universal, that is capable of being applied to a plurality of different types of fenders, the clamp member $B^1$ in its inner face and adjacent the outer leg $b$ is curved to two different radii, as at $b^5$ and $b^6$. For the same reason, the inner clamp member $B^2$, in its bottom edge, is formed with two spaced recesses $b^7$ and $b^8$ and an intermediate projection $b^9$, the recess $b^7$ being formed just below the wedging surface $b^3$ adapted to contact the fender, while the other recess $b^8$ is disposed nearer the center of the member.

The manner in which the members $B^1$ and $B^2$ cooperate to accommodate fenders shaped differently at their lower edges can best be understood by reference to Figs. 2 and 8 to 10. Thus, in Fig. 2, the clamp is shown applied to a fender wherein the lower edge is turned inwardly and upwardly, as at $A^3$. Here, it will be noticed that the outer clamp member $B^1$ is in contact with the fender along the inner face of the leg $b$ and along the curved surface $b^5$. The inner clamping member $B^2$ is in contact with the fender along the wedging surface $b^3$ and at the bottom where the projection $b^9$ engages the inner face of the rebent fender portion $A^3$. The inner recess $b^8$, it will be noticed, is of sufficient depth to accommodate the upwardly extending rebent portion of the fender.

In Fig. 8, a fender is shown wherein the bent portion $A^4$ terminates in a plane substantially at right angles to the vertical plane of the fender. Here, above the bent portion, the fender is gripped between the inner and outer clamp members $B^1$ and $B^2$, while down below it is engaged at the top by the protrusion $b^9$ on the inner clamp member and at the bottom by that portion of the outer clamp member which is located between the two curved portions $b^5$ and $b^6$.

The fender shown in Fig. 9 is clamped in substantially the same way as that shown in Fig. 8. As this fender however, has more of a downward sweep, as at $A^5$, its lower end extends into the recess formed by the lower curved portion $b^6$ of the outer clamp member $B^1$, this curved portion presenting a recess deep enough for the purpose.

The fender illustrated in Fig. 10 is devoid of an inwardly bent portion and instead terminates in a bead $A^6$. When the clamp is affixed in place, this bead seats in the outer recess $b^7$ formed in the bottom face of the inner clamp member $B^2$, this member presenting a shoulder $b^{10}$ at the top of said recess which engages the bead at the top. It will be noticed that with each of the different fenders illustrated by way of example, there will be present at least three points of contact between the clamp members and the fender, which, if connected by lines, would form a triangle. In other words, there is an engagement of the fender by the clamp in at least three different points, so that when the inner member $B^2$ of the clamp is wedged home by screwing up the bolt $B^4$, there is absolutely no chance that the clamp can be pulled off the fender, unless, indeed, there is some failure of either the fender or the clamp.

The details of the construction of the outer clamp member have been hereinbefore set forth. The inner clamp member can partake of a number of different forms, and a few have been shown merely by way of illustration. The one that has been heretofore described and which is illustrated in Figs. 2, 6, 8, 9, and 10 can be molded of any of the well known phenol-plastics, hard rubber, wood or any other material suitable for the purpose. This member can also be made of pressed steel sheet, such as illustrated in Figs. 11 and 12. When thus made, the element is stamped to the proper shape and with a pair of ears E and $E^1$. The element is then bent to present two side portions $E^2$ and $E^3$ and an intermediate connecting end portion $E^4$, the ears being bent, one down and the other up, to span the space between the side portions, thereby giving added strength and presenting bearing portions for the bolt $B^4$ used to draw the respective parts of the clamp together. One side member can be notched in its top and bottom edges, as at $E^5$, to fit the ears and the parts at these points welded together to make an integral structure. The two side members are transversely drilled, as at $E^6$, to receive the bar holding bolts $D^1$ and $D^2$, it being understood that in their top and bottom edges and at the ends, the sides present the same configuration as the inner clamp member, previously alluded to.

In Figs. 13 and 14, there is illustrated an inner clamp member F made of molded rubber, which, for strength, is provided with a metal insert $F^1$, the metal insert being bent, as shown, to follow the edge contour of the member itself. This member is likewise provided with a vertical hole $F^2$ to accommodate the bolt $B^4$ through which the wedging action is applied. In line with the hole $F^2$, the rubber at the top and bottom is cut away, as at $F^3$ and $F^4$, down to the metal insert $F^1$, in order to provide a suitable bearing surface for the head and nut of the bolt $B^4$. The supporting bar D, instead of being connected to the member F, as in the embodiments previously described, is in this case, fastened to one or another of a pair of ears $F^5$ projecting from the lateral edges of the metal insert $F^1$ and extending beyond the lateral faces of the member as shown. Consequently, the bar D does not extend along the lateral face of the member, but instead terminates at the ear $F^5$ to which it is connected, and at this end is formed with an elongated flange $F^6$ by which it is secured to the ear $F^5$ through the medium of a pair of spaced bolts $F^7$ passing through registering holes provided for the purpose in the flange and ear. The rubber of which the member F is made can be of a resilient character and, when this is the case, the outer member which cooperates therewith can be made rigid, the inner member in this case providing the necessary give to allow the members to be wedged home. In other respects, the member is substantially the same and operates in the same manner as that described first above.

From what has been said, it will be apparent that the present invention presents a universal clamp readily applicable to a large number of different styles of contemporary automobiles and which in addition can be applied either to the left or the right hand fender of an automobile without modification in construction. It will be appreciated also that with the improved clamp, the attachment of the fender flap to the automobile can be made with the utmost dispatch, since with the cantalever construction herein described, it is necessary to have only one connection with the fender for each flap.

In the accompanying drawings, the invention has been shown merely by way of example and in preferred form, and obviously many variations and modifications may be made therein which will still be comprised within its spirit. It is to be understood, therefore, that the invention is not limited to any specific form or embodiment, except insofar as such limitations are specified in the appended claims.

Having thus described my invention, what I claim is:

1. A clamp for supporting a device on an automobile fender and including, in combination, an element having a portion arranged to engage the outer face of the fender and a portion disposed in spaced relation to the inner face of said fender, a second element adapted to be wedged between the second mentioned portion of the first element and the inner face of the fender for securing the clamp in place, said second mentioned element being formed with a plurality of recesses and an intermediate protrusion to cooperate with fenders shaped differently in their lower edges, and means secured to one of said elements for the attachment of the device to be supported.

2. A clamp for supporting a device on an automobile fender and including, in combination, an element having a portion arranged to engage the outer face of the fender and a portion disposed in spaced relation to the inner face of said fender, a second element adapted to be wedged between the second mentioned portion of the first element and the inner face of the fender for securing the clamp in place, said elements being formed in their opposed faces, one with curvatures of different radii, and the other with a plurality of recesses and an intermediate protrusion to cooperate with fenders shaped differently at their lower edges, and means secured to one of said elements for the attachment of the devices to be supported.

3. A clamp for attaching a device to a vehicle, said clamp including a substantially U-shaped member having one leg thereof adapted to engage a projecting part of said vehicle and the other leg disposed in spaced relation thereto, a second member adapted to be disposed between the legs of the first mentioned member and movable parallel thereto, and means for effecting such parallel movement and adapted to secure said two members together whereby the clamp is held rigidly in place on said vehicle part by pressure exerted by the second member on the first member and on said vehicle part.

4. A clamp for securing a device to a vehicle, said clamp including a substantially U-shaped member having one leg thereof adapted to engage a projecting part of said vehicle and the other leg disposed in spaced relation thereto, a wedge shaped member adapted to be disposed between the legs of the first mentioned member, and means for moving said wedge shaped member parallel thereto, said wedge shaped member filling the space between the vehicle part and the second mentioned leg of the first member and being so formed that, as it is moved parallel to the first member, it exerts pressure on said first member and on said vehicle part, whereby the clamp is held rigidly in place on said vehicle part.

5. A clamp according to claim 3, wherein one of said members is resilient.

6. A clamp according to claim 3, wherein the means for securing the two members together includes a threaded element for effecting the parallel movement between the members.

7. A clamp according to claim 3, wherein one of the members has a portion formed of molded rubber and which is adapted to engage the vehicle part.

8. A clamp according to claim 3, wherein one of the members is formed of molded rubber with a metal reinforcing element.

9. A clamp according to claim 3, wherein one of the members is provided with a bar and wherein the device to be attached to the vehicle is a fender flap which is suspended from the bar.

10. A clamp for attaching a device to a vehicle, said clamp including a substantially U-shaped member having one leg thereof adapted to engage a projecting part of said vehicle and the other leg disposed in spaced relation thereto, a second member adapted to be disposed between the legs of the first mentioned member and movable parallel thereto, and means securing said two members together whereby the clamp is held rigidly in place on said vehicle part by pressure exerted by the second member on the first member and on said vehicle part, said first mentioned member being formed with a plurality of non-concentric curved portions to accommodate vehicle parts having different configurations.

11. A clamp for attaching a device to a vehicle, said clamp including a substantially U-shaped member having one leg thereof adapted to engage a projecting part of said vehicle and the other leg disposed in spaced relation thereto, a second member adapted to be disposed between the legs of the first mentioned member and movable parallel thereto, and means securing said two members together whereby the clamp is held rigidly in place on said vehicle part by pressure exerted by the second member on the first member and on said vehicle part, said second mentioned member being formed with a plurality of non-concentric curved portions to accommodate vehicle parts having different configurations.

12. A clamp according to claim 3, wherein one of the members is provided with a bar, and wherein the device to be attached to the vehicle is a fender flap which is suspended from the bar, and means for adjusting the fender flap angularly with respect to the bar.

WALTER C. JACKSON.